(12) United States Patent
Ennis (10) Patent No.: US 8,528,232 B1
(45) Date of Patent: Sep. 10, 2013

(54) SYSTEM AND APPARATUS FOR STRIPPING FLUIDS FROM THE SURFACE OF A VEHICLE

(71) Applicant: G. Thomas Ennis, Inglewood, CA (US)

(72) Inventor: G. Thomas Ennis, Inglewood, CA (US)

( * ) Notice: Subject to any disclaimer, the term of this patent is extended or adjusted under 35 U.S.C. 154(b) by 0 days.

(21) Appl. No.: 13/659,731

(22) Filed: Oct. 24, 2012

Related U.S. Application Data

(60) Provisional application No. 61/551,617, filed on Oct. 26, 2011.

(51) Int. Cl.
*F26B 19/00* (2006.01)

(52) U.S. Cl.
USPC ............ 34/666; 34/229; 34/233; 414/222.01; 193/35 B; 134/18; 134/12; 15/230; 15/209.1; 198/782

(58) Field of Classification Search
USPC ........ 34/90, 666, 229, 232, 233; 414/222.01; 193/35 B; 134/18, 32, 45, 123; 15/230, 15/209.1; 198/782
See application file for complete search history.

(56) References Cited

U.S. PATENT DOCUMENTS

| 2,132,303 | A | * | 10/1938 | Lathrop | 34/105 |
| 2,448,834 | A | * | 9/1948 | Rousseau | 34/666 |
| 3,279,093 | A | * | 10/1966 | Dutton | 34/229 |
| 3,442,027 | A | * | 5/1969 | Hurwitz | 34/571 |
| 3,471,883 | A | * | 10/1969 | Ennis | 15/53.3 |
| 3,757,428 | A | * | 9/1973 | Runciman | 34/340 |
| 4,079,524 | A | * | 3/1978 | Amicel et al. | 34/95 |
| 4,161,801 | A | * | 7/1979 | Day et al. | 15/316.1 |
| 4,418,442 | A | | 12/1983 | Day | |
| 4,433,450 | A | * | 2/1984 | McElroy et al. | 15/316.1 |
| 4,445,251 | A | | 5/1984 | McElroy | |
| 4,446,592 | A | | 5/1984 | McElroy | |
| 4,589,160 | A | * | 5/1986 | Day et al. | 15/316.1 |
| 4,683,668 | A | * | 8/1987 | Hondzinski et al. | 34/229 |
| 4,700,426 | A | | 10/1987 | McElroy | |
| 4,969,272 | A | * | 11/1990 | Schleeter et al. | 34/666 |
| 4,979,316 | A | * | 12/1990 | Belanger et al. | 34/666 |
| D315,232 | S | * | 3/1991 | Belanger et al. | D32/4 |
| 5,184,369 | A | * | 2/1993 | McElroy et al. | 15/316.1 |
| 5,187,881 | A | | 2/1993 | McElroy | |

(Continued)

FOREIGN PATENT DOCUMENTS

DE 4019819 A1 * 1/1992
EP 489234 A1 * 6/1992

(Continued)

OTHER PUBLICATIONS

Wipe-O-Matic automatic Chamois Dryer. www.Sonysdirect.com dated May 2013.*

(Continued)

*Primary Examiner* — Steve M Gravini
(74) *Attorney, Agent, or Firm* — Risso & Associates (57) ABSTRACT

Described is a system and apparatus for stripping fluids from the surface of a passing vehicle. The apparatus includes an inflatable blower bag for attaching with a duct structure. The inflatable blower bag includes an entrance for receiving air from the support structure and an exit for directing air onto a passing vehicle. A flexible water stripping blade is positioned proximate the exit such that as the bag falls onto a passing vehicle, the flexible blade engages with the passing vehicle and strips water from the passing vehicle.

20 Claims, 7 Drawing Sheets

(56) References Cited

U.S. PATENT DOCUMENTS

| | | | |
|---|---|---|---|
| 5,195,207 A | 3/1993 | McElroy | |
| 5,280,665 A | 1/1994 | McElroy | |
| 5,421,102 A * | 6/1995 | McElroy et al. | 34/541 |
| 5,596,818 A * | 1/1997 | Jones | 34/666 |
| 5,709,039 A * | 1/1998 | Jones | 34/558 |
| 5,755,043 A * | 5/1998 | Belanger et al. | 34/666 |
| 5,960,564 A * | 10/1999 | McElroy et al. | 34/666 |
| 6,021,584 A * | 2/2000 | Schwartz | 34/666 |
| 2005/0086835 A1* | 4/2005 | Faytlin | 34/666 |
| 2006/0218818 A1* | 10/2006 | Christopher | 34/666 |
| 2007/0028482 A1* | 2/2007 | Wimmer et al. | 34/666 |
| 2010/0154843 A1* | 6/2010 | Ennis | 134/123 |
| 2010/0275459 A1* | 11/2010 | Wentworth et al. | 34/666 |
| 2011/0155175 A1* | 6/2011 | Ennis | 134/18 |
| 2011/0315172 A1* | 12/2011 | Ennis | 134/123 |
| 2012/0124761 A1* | 5/2012 | Ennis et al. | 15/53.3 |
| 2012/0125379 A1* | 5/2012 | Ennis | 134/123 |
| 2012/0291308 A1* | 11/2012 | Mcelroy et al. | 34/666 |

FOREIGN PATENT DOCUMENTS

| | | |
|---|---|---|
| EP | 588391 A1 * | 3/1994 |
| JP | 2000042300 A * | 2/2000 |
| JP | 2008012402 A * | 1/2008 |
| WO | WO 2009011541 A1 * | 1/2009 |

OTHER PUBLICATIONS

Air Force Blaster. www.cardryer.com dated May 2013.*

* cited by examiner

SYSTEM AND APPARATUS FOR STRIPPING FLUIDS FROM THE SURFACE OF A VEHICLE

CROSS REFERENCE TO RELATED APPLICATIONS

This application is a non-provisional application of U.S. Provisional Application Ser. No. 61/551,617, filed on Oct. 26, 2011, and entitled, "System and Apparatus for Stripping Fluids From the surface of a Vehicle."

BACKGROUND OF THE INVENTION (1) Field of Invention

The present invention relates to a blower system and, more particularly, to a system and apparatus for use in a vehicle washing system for stripping water and other fluids from a vehicle passing through the vehicle washing system.

(2) Description of Related Art

Vehicle washing systems have long been known in the art. By way of example, automatic vehicle-washing systems are well-known and are in widespread use for washing passenger automobiles, trucks, buses, railroad equipment, and the like. A typical system includes a conveyor for moving the vehicle through the installation, and a series of power-driven brushes which are moved around the vehicle under a drenching spray of water and soap or detergent to remove dirt and grease. The washed vehicle is given a spray of clean rinse water, which is then removed from the vehicle using a blower system. The blower system serves to strip the water from the vehicle and dry the vehicle. Finally, after being washed and dried, the conveyor pushes the vehicle from the washing system.

Existing blower systems use inflatable bags that rise above a passing vehicle and blow air from the bags onto the vehicle. As the air is focused and directed from the bags onto the vehicle, the force of the air strips water and fluids from the passing vehicle. Although the air is used to inflate and raise the bags, the bags must be close enough to the vehicle to allow the air to have sufficient force to strip the water and fluids from the vehicle. Thus, in attempting to have sufficient air force yet allow the bags to be close to the vehicle, it is common that the bags actually engage with the passing vehicle. In other words, blower systems of the prior art use inflatable air bags that often rest on the passing vehicle and, in some cases, generate a resounding "thud" as the bags fall onto the vehicle. As one can imagine, vehicle owners typically dislike the prospect of a foreign item falling onto and/or brushing against their vehicle.

To reduce the impact of the bags brushing against a passing vehicle, U.S. Pat. No. 4,446,592, issued to McElroy, teaches a blower system in which the nozzle of each inflatable bag includes a series of rollers. The rollers serve to allow the inflatable bag to roll across a surface of a vehicle instead of being dragged against the vehicle. Although the rollers may reduce the friction between the inflatable bag and the passing vehicle, they do little to lessen the "thud" impact as the inflatable bag falls onto the vehicle. Further, the rollers, in of themselves, provide no assistance in stripping the water and fluids from the vehicle.

Thus, a continuing need exists for a blower system that softens the impact of an inflatable bag as it engages with a passing vehicle while also assisting in striping the water and fluids from the vehicle.

SUMMARY OF INVENTION

While considering the failure of others to make use of all of the above components in this technology space, the inventor unexpectedly realized that blower bag with a blade would alleviate the issues presented by the prior art while effectively stripping water from a passing vehicle.

Thus, described is a system and apparatus for stripping fluids from the surface of a passing vehicle. The apparatus includes at least one inflatable blower bag for attaching with a duct structure. The inflatable blower bag includes an entrance for receiving air from the duct structure and an exit for directing air onto a passing vehicle. A flexible water stripping blade is positioned proximate the exit such that as the bag falls onto or engages a passing vehicle, the flexible blade engages with the passing vehicle and strips water from the passing vehicle.

A stripping sprayer system can also be included. The stripping sprayer system is positioned proximate the exit and is adapted to spray a fluid onto the vehicle prior to introduction to the exit of the blower bag and the water stripping blade. Thus, the spray of fluid causes fluid already present on the vehicle to begin motion in a desired direction, such when the air contacts the fluid on the vehicle, the fluid is already moving in a desired direction to be stripped from the vehicle.

In one aspect, the stripping sprayer system includes a water pipe that is attached with the blower bag proximate the exit of the blower bag, the water pipe being fed fluid via tubing. The water pipe includes multiple exits for directing a water spray onto a passing vehicle.

In yet another aspect, the invention includes a support structure for attaching with the blower bag. The support structure is attachable with the blower bag for providing support to the blower bag yet allows for relative motion between the blower bag and support structure. As an example, the support structure includes a paddle portion with a paddle base that is pivotally attached with a base portion, the base portion formed to be rigidly attached with the duct structure. The support structure also includes a sliding member, while the blower bag includes a sliding member attachment for attaching with the sliding member. Further, the support structure includes a tubular length and the sliding member is attached with the support structure such that it adapted to slide along the tubular length.

In another aspect, the apparatus includes a duct structure for providing air to the blower bag. Further, duct structure includes a plurality of inflatable blower bags attached thereto, including top blower bags and side blower bags. A lift structure can be attached with each top blower bag to control descent of the top blower bags.

In another aspect, the lift structure includes a tension device; a support arm with a pulley that extends over a top blower bag; and a tether attached with the top blower bag that rises from the top blower bag, around the pulley, and into the tension device. The tension device is adapted to receive the tether freely as the top blower bag is lifted up, while applying tension to the tether as the top blower bag drops, thereby causing the top blower bag to slowly lower in a controlled manner after a vehicle passes.

In another aspect, the duct structure rises from a ground surface such that it is tilted forward at an angle off of vertical, the angle being between 15 and 25 degrees off of vertical.

Finally, the present invention is also directed to a method for making and using the invention described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a blower system and, more particularly, to a system and apparatus for use in a vehicle washing system for stripping water and other fluids from a vehicle passing through the vehicle washing system. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Introduction

Figure 1:
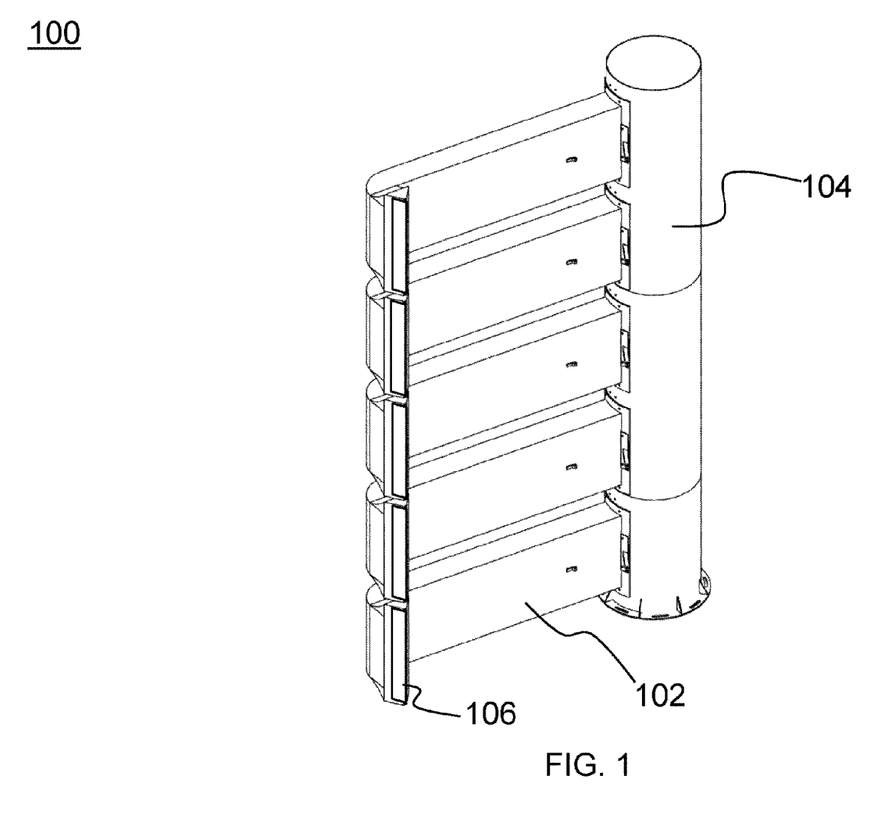
FIG. 1 is an illustration of system and apparatus for stripping fluids from the surface of a vehicle, illustrating the duct structure with the blower bags attached thereto.

As shown in FIG. 1, the present invention is directed to a drying apparatus 100 for stripping water and other fluids from a vehicle passing through a vehicle washing system. The drying apparatus 100 includes a plurality of inflatable blower bags 102, each of which is attached to a duct structure 104 that feeds air into each of the blower bags 102. Importantly, each bag 102 includes a water stripping blade 106 (e.g., flexible plastic or nylon wipe blade) that provides a marked improvement over the prior art by simultaneously softening the impact of each bag 102 as it engages with a passing vehicle while also assisting in stripping the water and fluids from the vehicle. Further specific details are provided below.

(2) Specific Details

Figure 2:
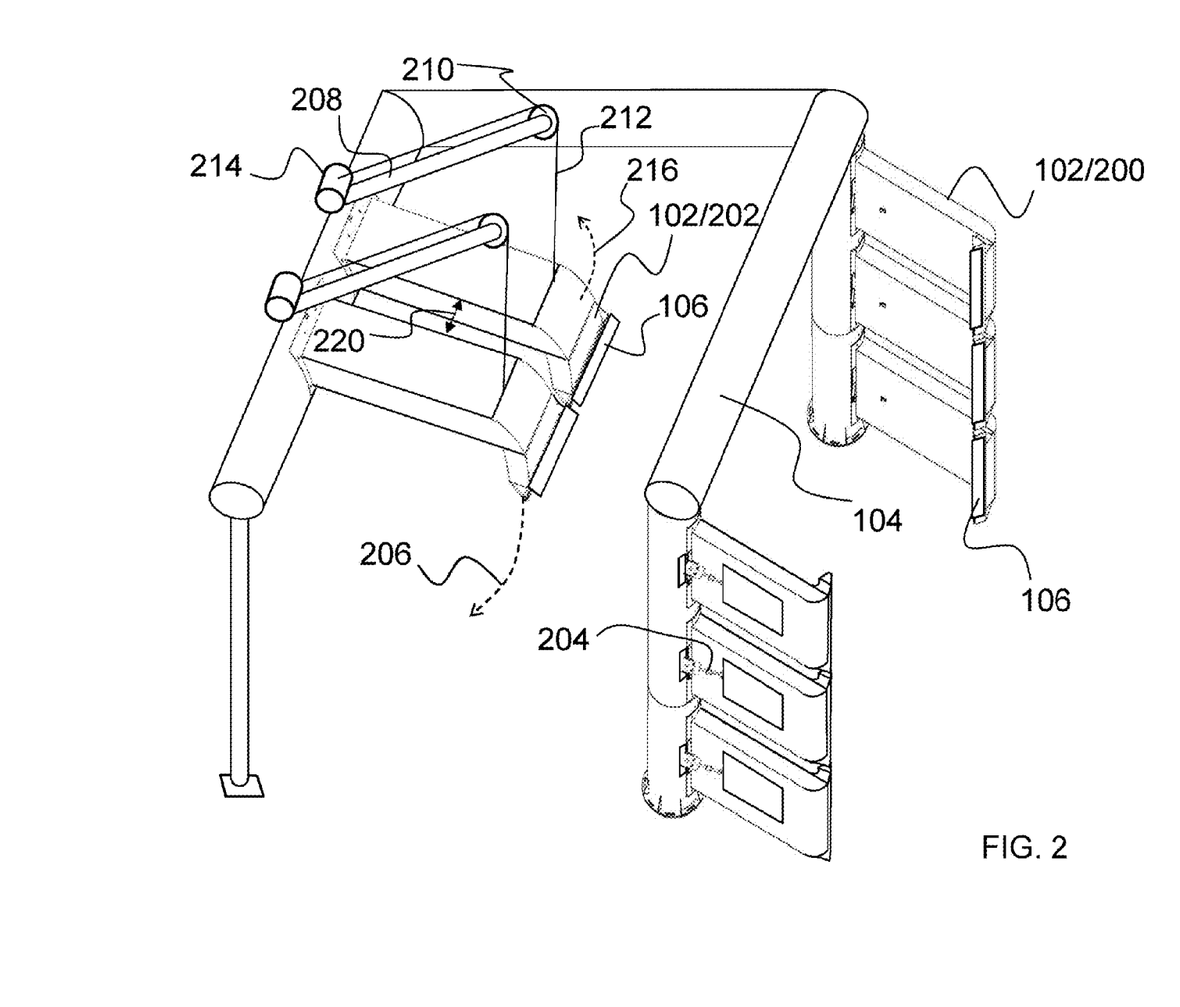
FIG. 2 is an illustration depicting a duct structure having both top blower bags and side blower bags.

As noted above, the present invention is directed to a drying apparatus 100 for stripping water and other fluids from a vehicle passing through a vehicle washing system. The duct structure 104 is part of a system where a powerful current of air is moved through the duct structure 104 and blower bags 102. As shown in FIG. 1, the duct structure 104 can be a stand-alone unit that holds a plurality of blower bags 102 or, as shown in FIG. 2, the duct structure 104 can be part of a larger unit that provides air to both side blower bags 200 and top blower bags 202. Importantly, either one of or both of the side 200 and top 202 blower bags include the water stripping blade 106 to assist in stripping the water from the passing vehicle.

The side blower bags 200 are formed to include a support structure 204 that helps to support the bags 200 and prevent them from dropping to the ground. While the support structure 204 allows the side blower bags 200 to pivot into and out of the path of a passing vehicle, the support structure 204 also prevents the bags from falling entirely when air is not being provided to the bags 200 through the duct structure 104. In other words, the support structure 204 operates as backbone to assist in the stability and motion of the side blower bags 200. When the invention is in use, the powerful air current moves through the duct structure 104 and into the blower bags 102, thereby inflating the bags 102.

Figures 3A, 3B:
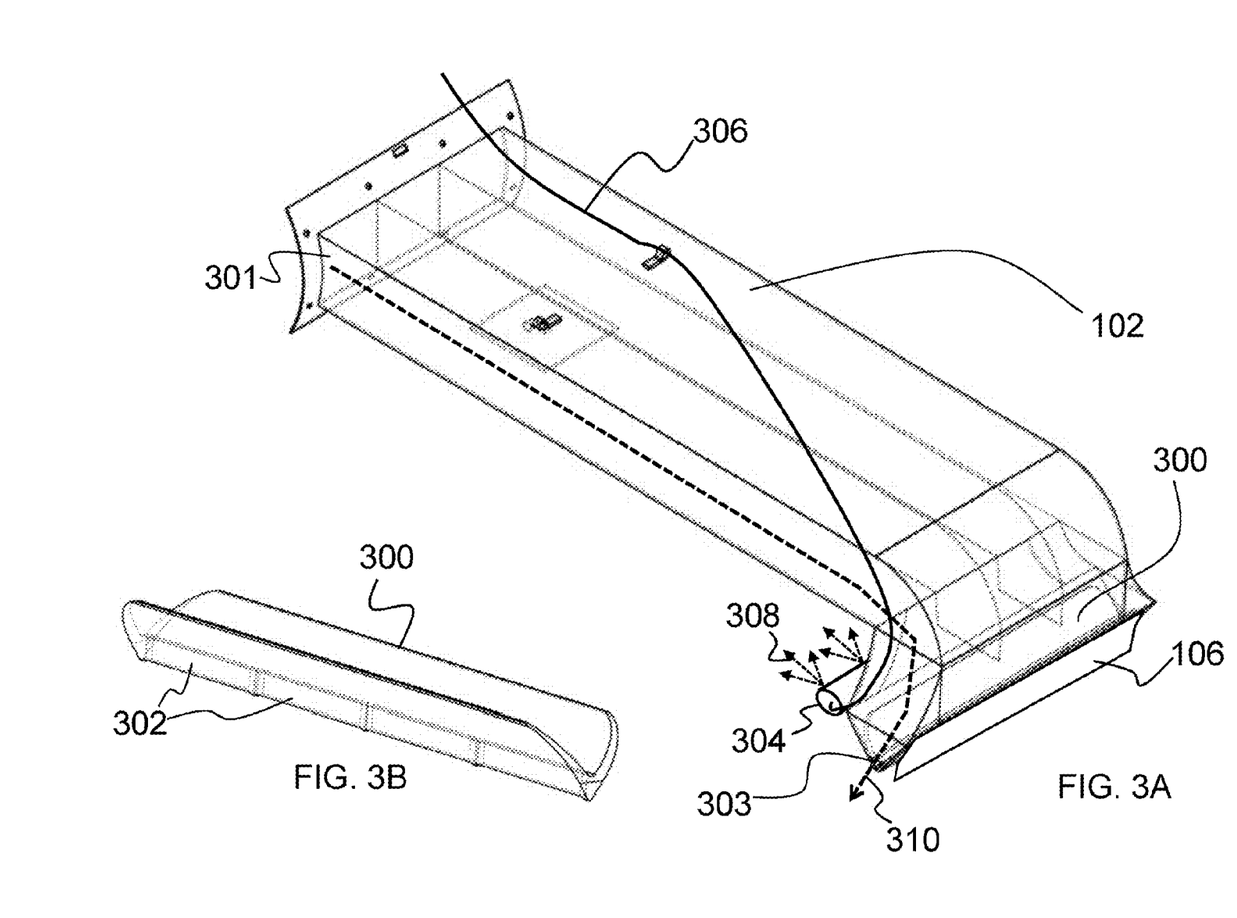
FIG. 3A is an illustration of a blower bag and its corresponding air nozzle.
FIG. 3B is an illustration of the air nozzle as removed from the blower bag.

FIG. 3A depicts a blower bag 102 and its corresponding air nozzle 300, while FIG. 3B depicts the air nozzle 300 as removed from the blower bag. As shown in FIG. 3A, the blower bag 102 includes an entrance 301 for receiving air from the duct structure and an air nozzle 300 that is positioned in the exit 303 (nozzle end) of the blower bag 102. While the blower bag 102 itself is formed of a flexible material (such as flexible nylon, etc.), the air nozzle 300 is typically formed of a more rigid material, such as hard plastic.

The air nozzle 300 is affixed with the blower bag 102 at the exit end to regulate the air flow coming from the blower bag 102. The air nozzle 300 is affixed with the blower bag 102 using any suitable technique, a non-limiting example of which includes being glued to one another. Regardless of how they are connected, the air nozzle 300 operates to focus the air passing through the blower bag 102 and, thereby, increase the pressure/force at which the air leaves the blower bag 102. Specifically, the air nozzle includes a plurality of channels 302 that are formed through the air nozzle 300 and that direct the air toward a passing vehicle.

Figure 4A:
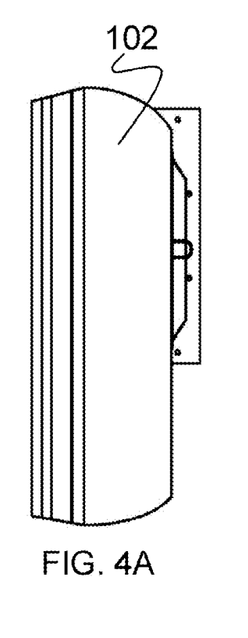
FIG. 4A is a nozzle-end view illustration of a blower bag.
Figure 4B:
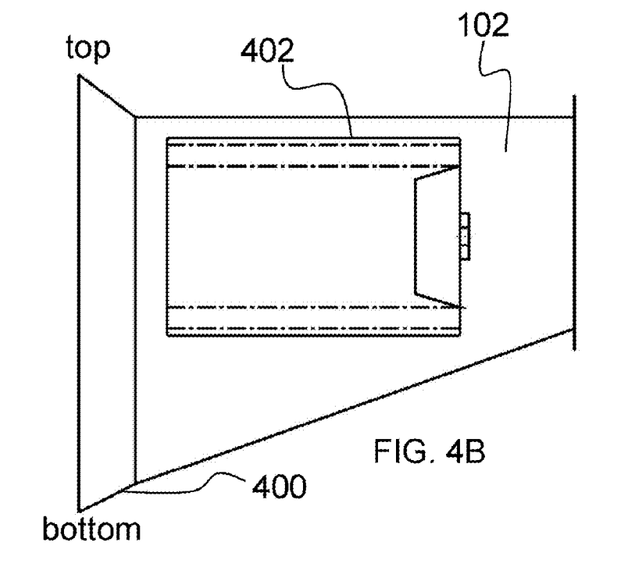
FIG. 4B is a side-view illustration of the blower bag.
Figure 4C:
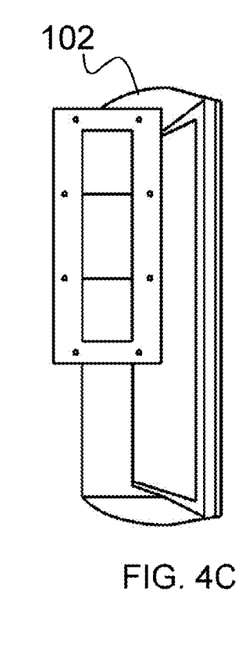
FIG. 4C is an intake-end view illustration of the blower bag.
Figure 4D:
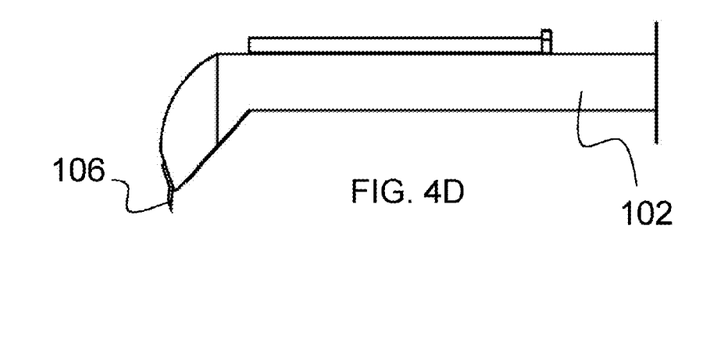
FIG. 4D is a top-view illustration of the blower bag.

The blower bag 102 can be formed in any suitable shape to direct air to a passing vehicle. Although FIGS. 1 through 3A illustrate a generally rectangular-shaped blower bag, the invention is not intended to be limited thereto. For example, FIGS. 4A through 4D illustrate various view-points of a blower bag 102 according to the present invention, depicting a blower bag 102 with a flare. Specifically, FIG. 4A is a nozzle-end view of the blower bag 102, while FIG. 4B is a side-view, FIG. 4C is an intake-end view, and FIG. 4D is a top-view. As shown in the side-view illustration of FIG. 4B, the blower bag 102 can be formed to flare 400 out. In this case, the flare 400 is projected downward to extend the air flow and blower bag 102 toward the bottom of a passing vehicle. For example, traditional blower bags do not direct stripping air toward the wheels of a passing vehicle. With the flare 400, the blower bag 102 is capable of reaching down further than traditional blower bags and can actually blow water from the tires and/or rims of a passing vehicle.

Also depicted in FIG. 4B is a support attachment 402 (as described in further detail below) for attaching with the support structure. Finally, FIG. 4D illustrates the blower bag 102 with the water stripping blade 106 attached thereto. As noted above, the water stripping blade 106 is a flexible strip of material that is used to strip the water from the vehicle, similar in function to a squeegee. The water stripping blade 106 is made of any suitably flexible material, non-limiting example of which include rubber, a polyurethane material, flexible plastic, or a nylon wiper blade. The water stripping blade 106 comes in direct contact with the vehicle and gently strips the water and other fluids away from the vehicle. Since the blade 106 is made up of soft and flexible material, the vehicle is unharmed with the stripping motion.

Along with the stripping action of the water stripping blade 106, the air nozzle directs a tremendous amount of air to dry the vehicle or otherwise blow the water and/or soap off of the vehicle. The combined air force with the stripping motion of the water stripping blade 106 creates a soft and gentle drying action that is efficient and prevents damage to the vehicle while avoiding the "thud" sound.

In another aspect and referring again to FIG. 3A, the blower bag 102 can be outfitted with a stripping sprayer system. The stripping sprayer system is any suitable mechanism or device that directs a fluid onto the vehicle to assist in stripping fluids from the vehicle. As a non-limiting example, the stripping sprayer system includes a water pipe 304 that is fed water via tubing 306. Multiple exits (e.g., hole or jet spray) are formed (or attached) in the water pipe 304 to direct a water spray 308 onto a passing vehicle prior to introduction to the air nozzle 300 and water stripping blade 106.

For example, the blower bag 102 and its air nozzle 300 direct a powerful air blast 310 onto the passing vehicle to blow the soap and/or water from the vehicle. However, prior to contact with the air blast 310, the fluid that is currently on the vehicle is either at rest or simply falling due to gravity. The stripping sprayer system blasts the vehicle and, more specifically, the existing fluid on the vehicle with a water spray 308 (or any other suitable fluid) to assist in rinsing the vehicle and initiating the direction of the fluid flow. In other words, because of the water spray 308 that engages fluid on the vehicle, the adhesion forces of the sitting fluid (against the vehicle) are largely removed as the fluid is then set in motion. Thus, when the air blast 310 contacts the fluid on the vehicle, the fluid is already moving in a desired direction to be stripped from the vehicle. As such, because the fluid on the vehicle is already in motion in the desired stripping direction, the air blast 310 is more efficient in removing water, with the water stripping blade 106 wiping the remaining water from the vehicle.

Figures 5A, 5B, 5C:
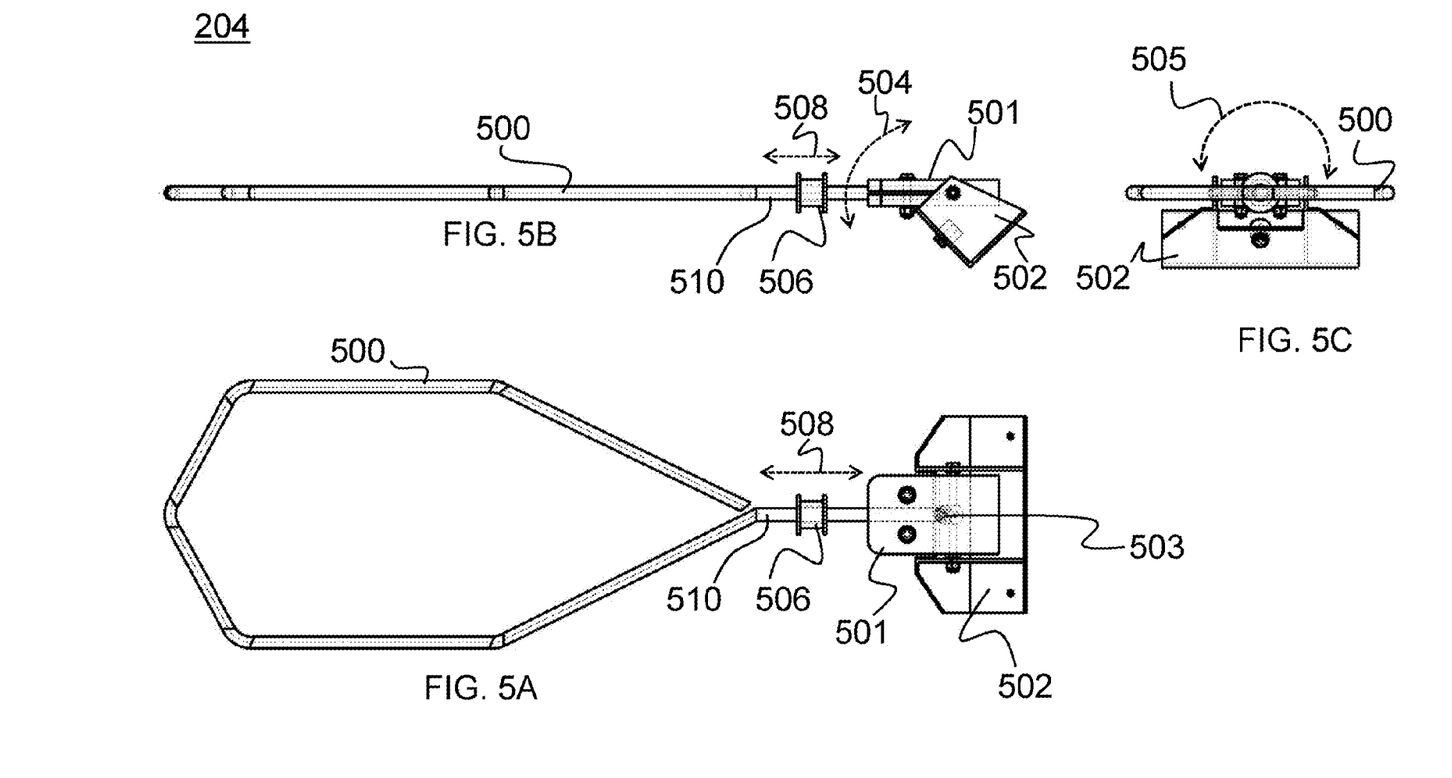
FIG. 5A is a side-view illustration of a support structure.
FIG. 5B is a top-view illustration of the support structure.
FIG. 5C is a front-end view illustration of the support structure.
Figure 6A:
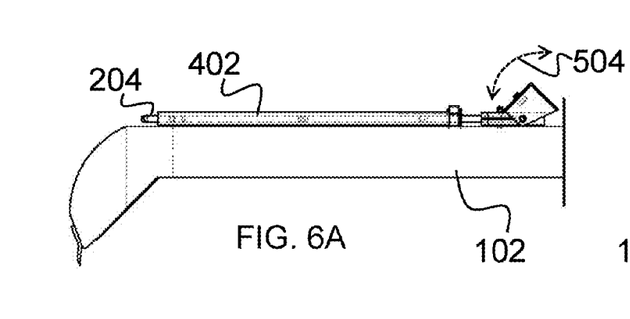
FIG. 6A is a top-view illustration of the blower bag with the support structure attached thereto.
Figure 6B:
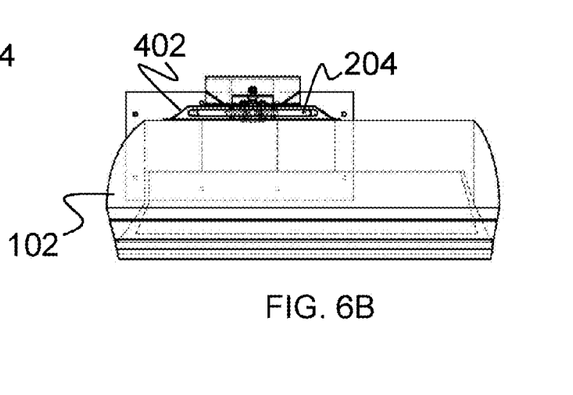
FIG. 6B is a nozzle-end view illustration of the blower bag with the support structure attached thereto.
Figure 6C:
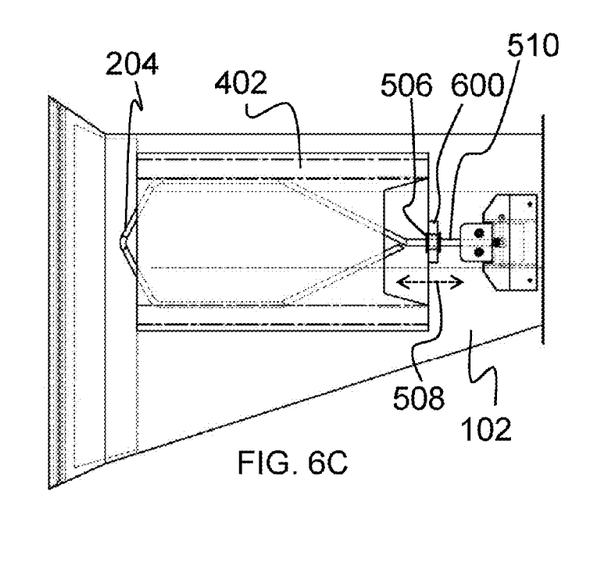
FIG. 6C is a side-view illustration of the blower bag with the support structure attached thereto.
Figure 6D:
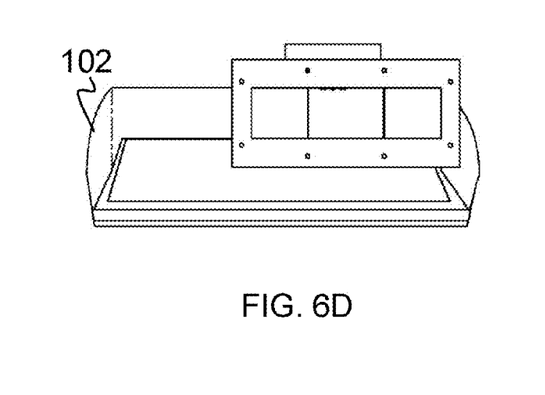
FIG. 6D is an intake-end view illustration of the blower bag with the support structure attached thereto.

As noted above and referring to FIGS. 5A through 5C, the blower bags can be outfitted with a support structure 204. The support structure 204 is any suitable mechanism or device that that helps to support the bags and prevent them from dropping to the ground when not inflated. As a non-limiting example, the support structure 204 can be a bar that is pivotally connected with the duct structure and positioned inside of each of the blower bags. Another non-limiting example is depicted in FIGS. 5A through 5C. More specifically, FIGS. 5A, 5B, and 5C provide side-view, top-view, and front-view illustrations, respectively, of the support structure 204. The support structure can be formed in any suitable shape 204 to provide some rigid support to the blower bags, a non-limiting example of which includes being formed in a paddle-shape, as illustrated in FIG. 5A. The paddle-shape assists in supporting both the width and length of the blower bag. Thus, in this aspect, the support structure 204 includes a paddle portion 500 with a paddle base 501 that is pivotally attached with a base portion 502. The base portion 502 can be rigidly attached with the duct structure (as shown in FIG. 1), which allows the paddle portion 500 to pivot 504 into and out of the path of a passing vehicle. Optionally, the paddle portion 500 can be rotatably attached 503 with the paddle base 501 to allow the paddle portion to rotate 505. Thus, in addition to being able to pivot 504, the paddle can also rotate 500 with the contour of a passing vehicle to further support the rigidity of the blower bag while allowing the blower bag to move as needed to accommodate the passing vehicle. The paddle portion 500 is pivotally attached 503 with the paddle base 501 using any suitable connection mechanism or technique, a non-limiting example of which includes being affixed within a sleeve of the paddle base 501.

In another aspect, a sliding member 506 (e.g., grommet or ring) is attached with the support structure 204 such that it can be slid 508 along the length of the support structure 204. For example, the sliding member 506 is a grommet or ring that is positioned around a tubular length 510 of the paddle portion 500 to allow the sliding member 506 to freely slide 508 along the tubular length 510. As will be described in further detail below, the sliding member 506 allows for relative motion between the support structure 204 and the blower bag, while still maintaining attachment and stability between the two.

For further understanding, FIGS. 6A through 6D illustrate the blower bag 102 with the support structure 204 attached thereto. Specifically, FIGS. 6A, 6B, 6C, and 6D provide top-view, nozzle-end view, side-view, and intake-end view illustrations, respectively, of the blower bag 102 and support structure 204. The support structure 204 is attached with the blower bag 102 using a support attachment 402. The support attachment 402 is any suitable mechanism or device that is operable for affixing the support structure 204 with the blower bag 102. As a non-limiting example, the support attachment 402 includes a pocket or sleeve that is stitched onto the exterior of the blower bag 102. Thus, in this aspect, the support structure 204 can simply be slid into the pocket or sleeve, thereby affixing the blower bag 102 with the support structure 204.

Further, the blower bag 102 can include a sliding member attachment 600 for attaching with the sliding member 506.

The sliding member attachment 600 is any suitable mechanism or device that allows the bag to fixedly attached with the sliding member 506, a non-limiting example of which includes a strap stitched to the exterior of the blower bag 102. Thus, in this aspect, the strap is simply wrapped around the grommet or ring. In operation, as the support structure 204 pivots 504 into and out of the path of a passing vehicle, the paddle portion 500 slides within support attachment 402 (e.g., sleeve), while the sliding member 506 is allowed to slide 508 along the tubular length 510. As can be appreciated by one skilled in the art, there are other techniques by which a support structure can be affixed with the blower bag 102 to maintain stability of the blower bag 102 while still allowing for relative motion between the two. Thus, although a specific example is described above and illustrated in the figures, it should be understood that the present invention is not intended to be limited thereto.

Alternatively and referring again to FIG. 2, the top blower bags 202 can optionally be formed to include a lift structure that prevents the top blower bags 202 from dropping quickly and forcefully onto an approaching vehicle. In other words, as a vehicle engages with the top blower bags 202, the top blower bags 202 are lifted up 216 by the passing vehicle. After the vehicle passes, gravity would naturally cause the top blower bags 202 to drop/lower immediately. While causing the top blower bags 202 to lower into the path of a passing vehicle is desirable so that they engage with the vehicle, it is more desirable to allow the top blower bags 202 to lower in a controlled manner. Thus, the lift structure operates in conjunction with the top blower bags 202 to prevent them from dropping too fast after a vehicle passes thereby. The lift structure is any suitable mechanism or device for controlling the descent 206 of the top blower bags 202, a non-limiting example of which includes a support arm 208 with a pulley 210 that extends over the top blower bag 202. A tether 212 (e.g., rope, cable, etc.) is attached with the top blower bag 202. The tether rises from the top blower bag 202, around the pulley 210, and into a tension device 214. The tension device 214 is any suitable mechanism or device for receiving and controlling the motion of the tether 212, non-limiting examples of which include a counter-balanced weight system and a clutch system. If a clutch system, the clutch system reels in or accepts the tether 212 freely as the top blower bags 202 are lifted up 216. Alternatively, tension is applied to the tether 212 as the top blower bags 202 drop 206 (after the vehicle passes). Thus, due to the tension, the top blower bags 202 are slowly lowered or allowed to drop 206 in a controlled manner via the tension provided by the tension device 214.

It should also be noted that the invention can be formed to include any suitable number of side 200 and top 202 blower bags. For example and as depicted, the system can be formed to include two top blower bags 202 that are attached with the duct structure 104. The top blower bags 202 can be spaced any suitable distance 220 from one another; however, desirably, the distance 220 between the two top blower bags 202 is less than eight inches (and more desirably, less than 4 inches) such that the top blower bags 202 are operable for wiping the entire topside of a vehicle, yet separate sufficiently to accommodate the center and top antennas that are commonly found on modern vehicles.

Figures 7A, 7B:
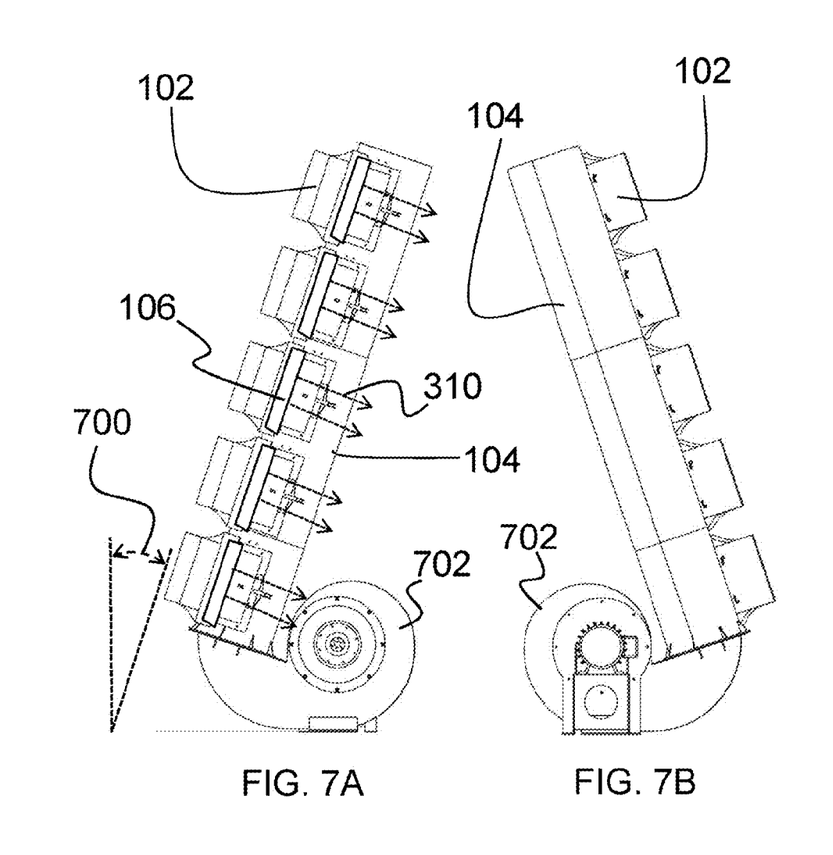
FIG. 7A is a left, side-view illustration of a duct structure with a plurality of blower bags attached thereto.
FIG. 7B is a right, side-view illustration of a duct structure with a plurality of blower bags attached thereto.
Figure 7C:
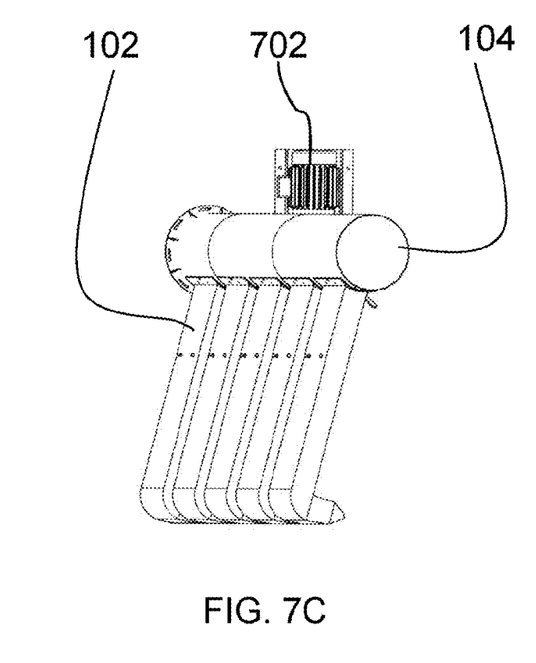
FIG. 7C is a top-view illustration of a duct structure with a plurality of blower bags attached thereto.

FIGS. 7A, 7B, and 7C provide left-side, right-side, and top view illustrations, respectively, of a duct structure 104 with a plurality of blower bags 102 attached thereto. As shown, the duct structure 104 can rise from ground surface such that it is tilted forward at an angle 700 (from vertical). By tilting the duct structure 104 posts at an angle 700 toward a passing vehicle, the blower bags 102 will be drawn by gravity toward the vehicle. The angle 700 is any suitable angle to allow the blower bags 102 to fall under gravity toward the passing vehicle. As a non-limiting example, the angle 700 is between 15 and 25 degrees and, more desirably, approximately 20 degrees.

The duct structure 104 is attached with a blower system 702. The blower system 702 is any suitable mechanism or device for providing air through the duct structure 104 and into the blower bags 102, a non-limiting example of which includes a turbine fan. Although FIGS. 7A through 7C depict the stand alone duct structure 104, it should be understood that the blower system 702 is applicable to any duct structure 104 in accordance with the present invention, including that depicted in FIG. 2. Thus, when the blower system 702 is activated and due to the restriction of the air nozzles within the blower bags 102, a bag pressure is created to keep the bags 102 in an inflated condition. When inflated, the air pressure in the blower bags 102 causes the bags 102 to become somewhat stiff or rigid. Accordingly, even though the bags 102 are made of a flexible material, they are somewhat self-supporting when inflated. The bags 102 are sufficiently deformable under an applied force so that when engaged by a vehicle moving through the car wash, the bags 102 may be pushed aside, with the air blast 310 and water stripping blade 106 removing the excess water and fluid from the passing vehicle.

What is claimed is:

1. A drying apparatus, comprising:
   at least one inflatable blower bag for attaching with a duct structure, the inflatable blower bag having an entrance for receiving air from the duct structure and an exit for directing air onto a passing vehicle; and
   a flexible water stripping blade positioned proximate the exit such that as the bag falls onto a passing vehicle, the water stripping black engages with the passing vehicle and strips water from the passing vehicle.

2. The drying apparatus of claim 1, further comprising a support structure for attaching with the blower bag, the support structure attachable with the blower bag for providing support to the blower bag yet allowing for relative motion between the blower hag and support structure.

3. The drying apparatus of claim 2, wherein the support structure includes a paddle portion with a paddle base that is pivotally attached with a base portion, the base portion formed to be rigidly attached with the duct structure.

4. The drying apparatus of claim 3, wherein the support structure includes a sliding member and the blower bag includes a sliding member attachment for attaching with the sliding member.

5. The drying apparatus of claim 4, wherein the support structure includes a tubular length and the sliding member is attached with the support structure such that it adapted to slide along the tubular length.

6. The drying apparatus of claim 5, further comprising a duct structure for providing air to the blower bag.

7. The drying apparatus of claim 6, wherein the duet structure includes a plurality of inflatable blower bags attached thereto, including top blower bags and side blower bags.

8. The drying apparatus of claim 7, further comprising a lift structure attached with each top blower bag to control descent of the top blower bags.

9. The drying apparatus of claim 8, wherein the lift structure further comprises:
   a tension device
   a support arm with a pulley that extends over a top blower bag;

a tether attached with the top blower bag that rises from the top blower bag, around the pulley, and into the tension device; and wherein the tension device is adapted to receive the tether freely as the top blower bag is lifted up, while applying tension to the tether as the top blower bag drops, thereby causing the top blower bag to slowly lower in a controlled manner after a vehicle passes.

10. The drying apparatus of claim 9, wherein the duct structure rises from a ground surface such that it is tilted forward at an angle off of vertical, the angle being between 15 and 25 degrees off of vertical.

11. The drying apparatus of claim 10, further comprising a stripping sprayer system positioned proximate the exit, the stripping spray system adapted to spray a fluid onto the vehicle prior to introduction to the exit of the blower bag and the water stripping blade, whereby the spray of fluid causes fluid already present on the vehicle to begin motion in a desired direction, such when the air contacts the fluid on the vehicle, the fluid is already moving in a desired direction to be stripped from the vehicle.

12. The drying apparatus of claim 11, wherein the stripping sprayer system includes a water pipe that is attached with the blower bag proximate the exit of the blower bag, the water pipe being fed fluid via tubing, and wherein the water pipe includes multiple exits for directing a water spray onto a passing vehicle.

13. The drying apparatus of claim 2, wherein the support structure includes a sliding member and the blower bag includes a sliding member attachment for attaching with the sliding member.

14. The drying apparatus of claim 13, wherein the support structure includes a tubular length and the sliding member is attached with the support structure such that it adapted to slide along the tubular length.

15. The drying apparatus of claim 1, further comprising a duct structure for providing air to the blower bag, wherein the duct structure includes a plurality of inflatable blower bags attached thereto, including top blower bags and side blower bags.

16. The drying apparatus of claim 15, further comprising a lift structure attached with each top blower bag to control descent of the top blower bags.

17. The drying apparatus of claim 16, wherein the lift structure further comprises:
 a tension device;
 a support arm with a pulley that extends over a top blower bag;
 a tether attached with the top blower bag that rises from the top blower bag, around the pulley, and into the tension device; and
 wherein the tension device is adapted to receive the tether freely as the top blower bag is lifted up, while applying tension to the tether as the top blower bag drops, thereby causing the top blower bag to slowly lower in a controlled manner after a vehicle passes.

18. The drying apparatus of claim 1, further comprising a duct structure for providing air to the blower bag, wherein the duct structure rises from a ground surface such that it is tilted forward at an angle off of vertical, the angle being between 15 and 25 degrees off of vertical.

19. A drying apparatus, comprising:
 at least one inflatable blower bag for attaching with a duct structure, the inflatable blower bag having an entrance for receiving air from the duct structure and an exit for directing air onto a passing vehicle; and
 a stripping sprayer system positioned proximate the exit, the stripping sprayer system adapted to spray a liquid fluid onto the vehicle prior to introduction to the exit of the blower bag, whereby the spray of liquid fluid causes fluid already present on the vehicle to begin motion in a desired direction, such when the air contacts the fluid on the vehicle, the fluid is already moving in a desired direction to be stripped from the vehicle.

20. A drying apparatus, comprising:
 at least one inflatable blower bag for attaching with a duct structure, the inflatable blower bag having an entrance for receiving air from the duct structure and an exit for directing air onto a passing vehicle;
 stripping sprayer system positioned proximate the exit, the stripping spray system adapted to spray a fluid onto the vehicle prior to introduction to the exit of the blower bag to cause fluid already present on the vehicle to begin motion in a desired direction; and
 a flexible water stripping blade positioned proximate the exit such that as the bag engages a passing vehicle, the water stripping blade engages with the passing vehicle and strips water from the passing vehicle, whereby the spray of fluid causes fluid already present on the vehicle to begin motion in a desired direction, such when the air contacts the fluid on the vehicle, the fluid is already moving in a desired direction to be stripped from the vehicle, with the flexible water stripping blade contacting the surface of the vehicle and stripping the fluid from the vehicle.

\* \* \* \* \*